United States Patent
Seok

(10) Patent No.: US 11,575,602 B2
(45) Date of Patent: *Feb. 7, 2023

(54) ACK POLICY FOR UPLINK AND DOWNLINK MU PPDU

(71) Applicant: Atlas Global Technologies LLC, Austin, TX (US)

(72) Inventor: Yongho Charles Seok, San Jose, CA (US)

(73) Assignee: Atlas Global Technologies LLC, Austin, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/343,865

(22) Filed: Jun. 10, 2021

(65) Prior Publication Data

US 2021/0297348 A1    Sep. 23, 2021

Related U.S. Application Data

(63) Continuation of application No. 16/507,968, filed on Jul. 10, 2019, now Pat. No. 11,063,866, which is a (Continued)

(51) Int. Cl.
*H04W 4/00* (2018.01)
*H04L 45/74* (2022.01)
(Continued)

(52) U.S. Cl.
CPC .............. *H04L 45/74* (2013.01); *H04L 1/16* (2013.01); *H04L 1/1685* (2013.01); *H04W 88/08* (2013.01)

(58) Field of Classification Search
CPC ... H04W 28/04; H04W 72/04; H04W 72/042; H04W 88/08; H04L 5/0007; H04L 45/74; H04L 1/16; H04L 1/1685; Y02D 30/70
See application file for complete search history.

(56) References Cited

U.S. PATENT DOCUMENTS 10,158,474 B2 * 12/2018 Cherian ................ H04L 1/1854
10,340,964 B2 *  7/2019 Suh ...................... H04L 27/2602
(Continued)

FOREIGN PATENT DOCUMENTS

CN     104350799 A       2/2015
EP     3361664 A1 *     8/2018   ........... H04L 1/1685
(Continued)

OTHER PUBLICATIONS

Office Action, TW App. No. 105117214, dated Feb. 12, 2020, 8 pages (5 pages of English Translation and 3 pages of Original Document).
(Continued)

*Primary Examiner* — Phuongchau Ba Nguyen
(74) *Attorney, Agent, or Firm* — Thomas J. Lavan

(57) ABSTRACT

An access point device coupled to a station through a wireless local area network to elicit a trigger-based immediate acknowledgement from the station is provided. The access point device is configured to one or more of generate trigger information for an uplink (UL) multiuser (MU) transmission, generate a frame, and transmit a downlink (DL) MU physical layer (PRY) Protocol Data Unit (PPDU) to the station. The DL MU PPDU includes the frame and the trigger information. An ACK policy field of the frame is set to a binary value of '01' to request the station to provide a trigger-based immediate acknowledgement where the station is to transmit a trigger-based immediate acknowledgement frame to the access point device according to the trigger information if the trigger information is obtained by the station and the station is to refrain from transmitting the trigger-based immediate acknowledgement frame to the access point device if the trigger information is not obtained by the station. The binary value of '01' is a reserved value in a Power Save Multi-Poll (PSMP) context for indicating
(Continued)

that a response frame to a received frame is allowed but neither an acknowledgement frame nor any data frame of subtype Contention Free-Acknowledgement (+CF-Ack) when bit 6 of a frame control field is set to '1', and for indicating that an acknowledgment for a frame received in a PSMP downlink transmission time (PSMP-DTT) is to be received in a later PSMP uplink transmission time (PSMP-UTT) when bit 6 of the frame control field is set to '0'.

8 Claims, 14 Drawing Sheets

Related U.S. Application Data continuation of application No. 15/666,843, filed on Aug. 2, 2017, now Pat. No. 10,397,110, which is a continuation of application No. 15/170,044, filed on Jun. 1, 2016, now Pat. No. 9,762,487.

(60) Provisional application No. 62/269,036, filed on Dec. 17, 2015, provisional application No. 62/260,188, filed on Nov. 25, 2015, provisional application No. 62/257,657, filed on Nov. 19, 2015, provisional application No. 62/205,570, filed on Aug. 14, 2015, provisional application No. 62/170,018, filed on Jun. 2, 2015.

(51) Int. Cl.
*H04L 1/16* (2006.01)
*H04W 88/08* (2009.01)

(56) References Cited

U.S. PATENT DOCUMENTS

| | | | |
|---|---|---|---|
| 10,476,648 B2 * | 11/2019 | Kim | H04L 5/0055 |
| 2011/0261742 A1 | 10/2011 | Wentink | |
| 2015/0063190 A1 | 3/2015 | Merlin et al. | |
| 2015/0124689 A1 * | 5/2015 | Merlin | H04L 1/009 370/312 |
| 2019/0208571 A1 * | 7/2019 | Ahn | H04W 80/02 |

FOREIGN PATENT DOCUMENTS

| | | | | |
|---|---|---|---|---|
| EP | 3275113 B1 * | 5/2022 | | H04L 1/1685 |
| SG | 10201701790 A1 * | 4/2017 | | H04L 69/04 |
| WO | 2014/182344 A1 | 11/2014 | | |

OTHER PUBLICATIONS

Allowance Decision, TW App. No. 105117214, dated Nov. 26, 2020, 3 pages (1 page of English Translation and 2 pages of Original Document).

* cited by examiner

FIG. 5

| Block ACK Request frame (AP to STA1) | DATA frame with ACK Policy set to Block ACK (AP to STA1) | Block ACK frame (STA1 to AP) | Block ACK Request frame (AP to STA2) | Block ACK frame (STA2 to AP) |
|---|---|---|---|---|
| | DATA frame with ACK Policy set to Implicit Block ACK Request (AP to STA2) | | | |

20MHz / 20MHz

FIG. 6

| Trigger frame (AP to STA1) | DATA frame with ACK Policy set to Block ACK (AP to STA1) | Block ACK Request frame (AP to STA1) | UL MU DATA (STA1 to AP) | Block ACK frame (STA1 to AP) |
|---|---|---|---|---|
| Trigger frame (AP to STA2) | DATA frame with ACK Policy set to Block ACK (AP to STA2) | Block ACK Request frame (AP to STA2) | UL MU DATA (STA2 to AP) | Block ACK frame (STA2 to AP) |

20MHz / 20MHz

| MU Block ACK Request frame (AP to STA1) | DATA frame with ACK Policy set to Block ACK (AP to STA1) | Block ACK frame (STA1 to AP) | UL MU DATA (STA1 to AP) | 20MHz |
|---|---|---|---|---|
| MU Block ACK Request frame (AP to STA2) | DATA frame with ACK Policy set to Block ACK (AP to STA2) | Block ACK frame (STA2 to AP) | UL MU DATA (STA2 to AP) | 20MHz |

FIG. 9

ACK POLICY FOR UPLINK AND DOWNLINK MU PPDU

CROSS-REFERENCE TO RELATED APPLICATIONS

This application is a continuation of U.S. application Ser. No. 16/507,968, filed Jul. 10, 2019, which is a continuation of U.S. application Ser. No. 15/666,843, filed Aug. 2, 2017, which is a continuation of U.S. application Ser. No. 15/170,044, filed Jun. 1, 2016 (issued as U.S. Pat. No. 9,762,487 on Sep. 12, 2017), which claims the benefit of U.S. Provisional Application No. 62/269,036, filed Dec. 17, 2015, U.S. Provisional Application No. 62/260,188, filed Nov. 25, 2015, U.S. Provisional Application No. 62/257,657, filed Nov. 19, 2015, U.S. Provisional Application No. 62/205,570, filed Aug. 14, 2015, and U.S. Provisional Application No. 62/170,018, filed Jun. 2, 2015, which are hereby incorporated by reference.

FIELD OF INVENTION

The embodiments of the invention are related to the field of Wireless Local Area Network (WLAN) operation. More specifically, the embodiments of the invention relate to methods and apparatus for acknowledging a physical layer (PHY) Protocol Data Unit (PPDU) in a multi-user (MU) transmission environment. Other embodiments are also disclosed.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called IEEE 802.11ax, High Efficiency (HE) WLAN standardization is under discussion. The HE aims at improving performance felt by users demanding high-capacity and high-rate services. The HE may support UL and DL MU simultaneous transmissions, which includes Multi-User Multiple-Input Multiple-Output (MU-MIMO) and Orthogonal Frequency Division Multiple Access (OFDMA) transmissions.

When an AP transmits a data frame to a STA during a DL MU transmission, the AP may solicit an immediate acknowledgement from the STA. For example, the AP may solicit an immediate acknowledgement from the STA by setting the ACK Policy field of the data frame to a binary value of '00'. According to current IEEE 802.11 specifications, setting the ACK Policy field in this way solicits an immediate acknowledgement from a STA in an SU manner.

The AP may transmit a DL MU physical layer (PHY) Protocol Data Unit (PPDU) eliciting STAs to provide acknowledgements. The STA may transmit an immediate ACK, transmit a delayed ACK, transmit the ACK in an SU manner, and transmit the ACK in an MU manner. If multiple STAs transmit ACKs using the same transmission resource (e.g., at the same time and frequency resource), it may cause collision.

SUMMARY

An access point device coupled to a station through a wireless local area network to elicit a trigger-based immediate acknowledgement from the station is provided. The access point device is configured to one or more of generate trigger information for an uplink (UL) multiuser (MU) transmission, generate a frame, and transmit a downlink (DL) MU physical layer (PRY) Protocol Data Unit (PPDU) to the station. The DL MU PPDU includes the frame and the trigger information. An ACK policy field of the frame is set to a binary value of '01' to request the station to provide a trigger-based immediate acknowledgement where the station is to transmit a trigger-based immediate acknowledgement frame to the access point device according to the trigger information if the trigger information is obtained by the station and the station is to refrain from transmitting the trigger-based immediate acknowledgement frame to the access point device if the trigger information is not obtained by the station. The binary value of '01' is a reserved value in a Power Save Multi-Poll (PSMP) context for indicating that a response frame to a received frame is allowed but neither an acknowledgement frame nor any data frame of subtype Contention Free-Acknowledgement (+CF-Ack) when bit 6 of a frame control field is set to '1', and for indicating that an acknowledgment for a frame received in a PSMP downlink transmission time (PSMP-DTT) is to be received in a later PSMP uplink transmission time (PSMP-UTT) when bit 6 of the frame control field is set to '0.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 5 is a diagram illustrating operations of an MU acknowledgement procedure, where a Block ACK Request frame elicits an immediate acknowledgement, according to some embodiments.

FIG. 6 is a diagram illustrating operations of an MU acknowledgement procedure, where a trigger frame elicits a UL MU transmission and a Block ACK Request frame and an ACK Policy field of a data frame elicit an immediate acknowledgement, according to some embodiments.

FIG. 9 is a diagram illustrating operations of an MU acknowledgement procedure, where an MU Block ACK Request frame elicits an immediate acknowledgement, according to some embodiments.

DETAILED DESCRIPTION

Figure 1:
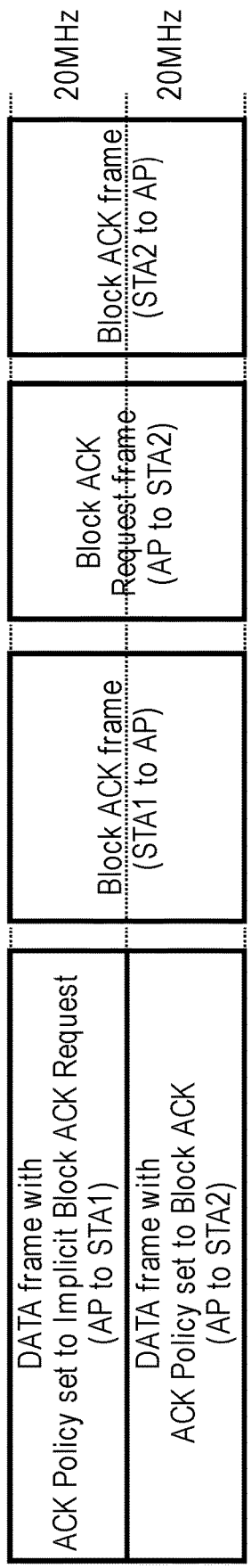
FIG. 1 is a diagram illustrating operations of an MU acknowledgement procedure, according to some embodiments.

The embodiments disclosed herein provide methods and apparatus for acknowledging a physical layer (PHY) Protocol Data Unit (PPDU) in a multi-user transmission environment. An embodiment is a method implemented by a station (STA) in a Wireless Local Area Network (WLAN) that utilizes the concept of a trigger-based immediate acknowledgement to acknowledge a downlink (DL) multi-user (MU) PPDU transmitted by an access point (AP). With a trigger-based immediate acknowledgement, a STA that successfully decodes trigger information for an uplink (UL) MU transmission from a DL MU PPDU transmitted by an AP transmits an acknowledgement frame to the AP in an MU manner during the UL MU transmission, according to the trigger information (e.g., using an allocated transmission resource). On the other hand, a STA that fails to successfully decode trigger information from a DL MU PPDU transmitted by an AP refrains from transmitting an acknowledgement frame to the AP (at least until after the UL MU transmission has finished). Other embodiments are also described and claimed.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a wireless local area network (WLANs). STAs are devices connected to and communicating in a WLAN including client or user devices that connect to the WLAN via APs. APs are network devices that may be specialized wireless access points that can communicate with other network devices in the WLAN via the wireless medium or via wired connections. A STA or AP may be referred to herein as a WLAN device.

Conventionally, when a WLAN device (e.g., STA or AP) transmits a data frame to another WLAN device, the transmitting WLAN device may indicate its desired acknowledgement policy in the data frame. For example, a 2-bit ACK Policy subfield in the QoS Control field (e.g., bit 5 and bit 6 of the QoS Control field) of a data frame can be used for this purpose. Table 1 shows how the ACK Policy subfield may be interpreted by a WLAN device.

TABLE 1

| Bits in QoS Control Field | | |
|---|---|---|
| Bit 5 | Bit 6 | Meaning |
| 0 | 0 | Normal ACK or Implicit BAR The addressed recipient returns an ACK or a Block ACK frame |
| 1 | 0 | No ACK The addressed recipient takes no action upon receipt of the frame |
| 0 | 1 | No explicit acknowledge or Power Save Multi-Poll (PSMP) ACK When bit 6 of the Frame Control field is set to 1: No data When bit 6 of the Frame Control field is set to 0: PSMP ACK |
| 1 | 1 | Block ACK The addressed recipient takes no action upon the receipt of the frame except for recording the state. The recipient can expect a Block ACK Request frame in the future |

In a task group called Institute of Electrical and Electronics Engineers (IEEE) 802.11ax, High Efficiency (HE) WLAN standardization is under discussion. The HE aims at improving performance felt by users demanding high-capacity and high-rate services. The HE may support UL and DL MU simultaneous transmissions, which includes Multi-User Multiple-Input Multiple-Output (MU-MIMO) and Orthogonal Frequency Division Multiple Access (OFDMA) transmissions.

When an AP (e.g., High Efficiency (HE) AP) transmits a data frame to a STA (e.g., High Efficiency (HE) STA) during a DL MU transmission, the AP may elicit an immediate acknowledgement from the STA. For example, the AP may elicit an immediate acknowledgement from the STA by setting the ACK Policy field of the data frame to a binary value of '00'. According to current IEEE 802.11 specifications, setting the ACK Policy field in this way elicits an immediate acknowledgement from a STA in an SU manner.

Each payload within a DL MU PPDU transmitted by an AP during a DL MU transmission may include a trigger frame that includes trigger information for a UL MU transmission. The trigger information may include information regarding the UL MU transmission such as the transmission length of the UL MU transmission and the allocation of transmission resources for the UL MU transmission. The presence of a trigger frame in a DL MU PPDU elicits the UL MU transmission. The STAs that successfully decode trigger information included in a trigger frame may transmit an acknowledgement frame (e.g., ACK frame or Block ACK (BA) frame) to the AP in an MU manner during the UL MU transmission, according to the trigger information (e.g., using the transmission resource assigned to the STA).

However, if a STA fails to successfully decode the trigger information, that STA may transmit an acknowledgement frame in an SU manner, which may cause collisions with other acknowledgement frames transmitted by other STAs during the UL MU transmission.

Embodiments overcome the disadvantages of existing techniques by introducing a new type of acknowledgement policy referred to herein as a trigger-based immediate acknowledgement. With a trigger-based immediate acknowledgement, a STA that successfully decodes trigger information for a UL MU transmission from a DL MU PPDU transmitted by an AP transmits an acknowledgement frame to the AP in an MU manner during the UL MU transmission, according to the trigger information (e.g., using an allocated transmission resource). On the other hand, a STA that fails to successfully decode trigger information from a DL MU PPDU transmitted by an AP refrains from transmitting an acknowledgement frame to the AP (at least until after the UL MU transmission has finished). In this way, a STA that fails to successfully decode trigger information from the DL MU PPDU will avoid transmitting an acknowledgement frame in an SU manner during the UL MU transmission, and thereby avoid causing collisions with acknowledgement frames transmitted by other STAs during the UL MU transmission.

FIG. 1 is a diagram illustrating operations of an MU acknowledgement procedure, according to some embodiments. For illustration purposes, the operations in this diagram and other diagrams will be described in the context of a simple WLAN that includes an AP and at least two STAs (e.g., STA1 and STA2). It should be understood, however, that the principles and concepts described herein are not limited thereto. In this diagram and some of the other diagrams (FIGS. 2-9), the horizontal dimension represents the time dimension, while the vertical dimension represents the frequency dimension. The AP transmits a data frame to each of STA1 and STA2 during a DL MU transmission (e.g., in a DL MU PPDU—which may be a DL OFDMA PPDU). The data frame intended for STA1 is transmitted in a first 20 MHz sub-channel and the data frame intended for STA2 is transmitted in a second 20 MHz sub-channel. The data frame intended for STA1 includes an ACK Policy field that is set to indicate an Implicit Block ACK Request acknowledgement policy (e.g., ACK Policy field is set to a binary value of '00'), which elicits an immediate acknowledgement from STA1. The data frame intended for STA2 includes an ACK Policy field that is set to indicate a Block ACK acknowledgement policy (e.g., ACK Policy field is set to a binary value of '11'), which solicits a delayed acknowledgement from STA2. With a Block ACK acknowledgement policy, STA2 can expect a Block ACK Request frame from the AP in the future and STA2 can transmit an acknowledgement frame to the AP in response to receiving the Block ACK Request frame from the AP.

Since the ACK Policy field of the data frame intended for STA1 is set to indicate an Implicit Block ACK Request acknowledgement policy, STA1 transmits a Block ACK frame to the AP in an SU manner. Since the ACK Policy field of the data frame intended for STA2 is set to indicate a Block ACK acknowledgement policy, the AP transmits a Block ACK Request frame to STA2 and STA2 transmits a Block ACK frame in response to receiving the Block ACK Request frame from the AP.

Figure 2A:
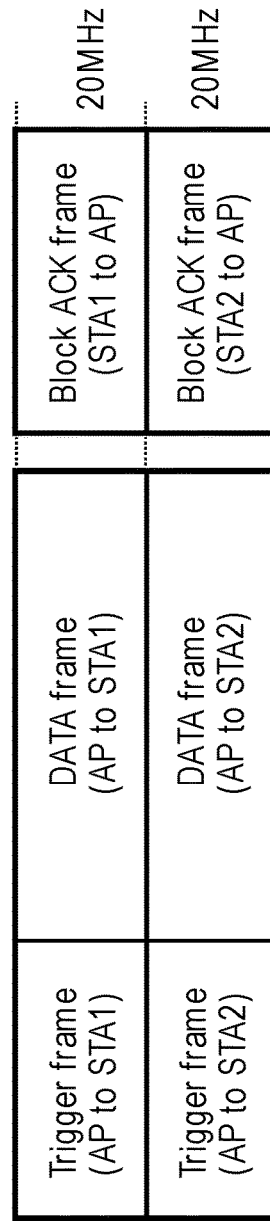
FIG. 2A is a diagram illustrating operations of an MU acknowledgement procedure, where a trigger frame elicits a UL MU transmission, according to some embodiments.

FIG. 2A is a diagram illustrating operations of an MU acknowledgement procedure, where a trigger frame elicits a UL MU transmission, according to some embodiments. The AP transmits a trigger frame and a data frame to each of STA1 and STA2 during a DL MU transmission (e.g., in a DL MU PPDU). The trigger frame and data frame intended for STA1 are transmitted in a first 20 MHz sub-channel and the trigger frame and the data frame intended for STA2 are transmitted in a second 20 MHz sub-channel. The data frame intended for STA1 and the data frame intended for STA2 elicit an immediate acknowledgement from STA1 and STA2, respectively. Each trigger frame includes trigger information for a UL MU transmission. For example, the trigger information may include scheduling information for scheduling a UL MU transmission. The presence of the trigger frames elicits a UL MU transmission. As such, STA1 and STA2 each transmit a Block ACK frame to the AP in an MU manner during the UL MU transmission (e.g., in a UL MU PPDU—which may be a UL OFDMA PPDU), according to the trigger information (e.g., using the transmission resource assigned to the STA).

Figure 2B:
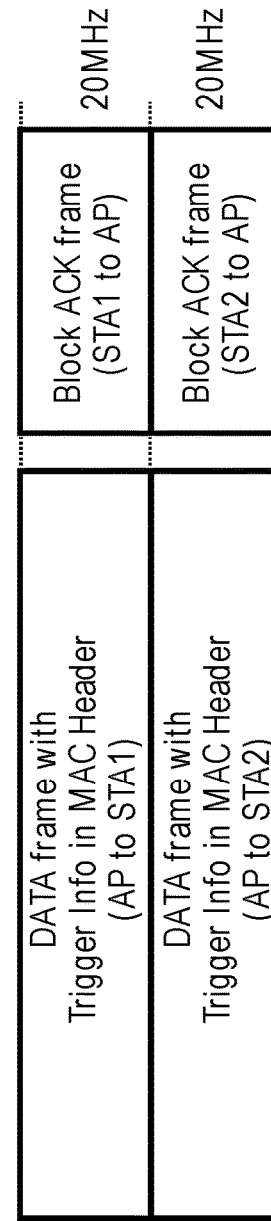
FIG. 2B is a diagram illustrating operations of an MU acknowledgement procedure, where trigger information included in a MAC header of a data frame elicits a UL MU transmission, according to some embodiments.

FIG. 2B is a diagram illustrating operations of an MU acknowledgement procedure, where trigger information included in a MAC header of a data frame elicits a UL MU transmission, according to some embodiments. The AP transmits a data frame to each of STA1 and STA2 during a DL MU transmission (e.g., in a DL MU PPDU), where each data frame includes trigger information in its MAC header. The data frame intended for STA1 is transmitted in a first 20 MHz sub-channel and the data frame intended for STA2 is transmitted in a second 20 MHz sub-channel. The data frame intended for STA1 and the data frame intended for STA2 elicit an immediate acknowledgement from STA1 and STA2, respectively. The presence of the trigger information in the MAC headers of the data frames elicits a UL MU transmission. As such, STA1 and STA2 each transmit a Block ACK frame to the AP in an MU manner during the UL MU transmission (e.g., in a UL MU PPDU), according to the trigger information (e.g., using the transmission resource assigned to the STA).

Figure 3:
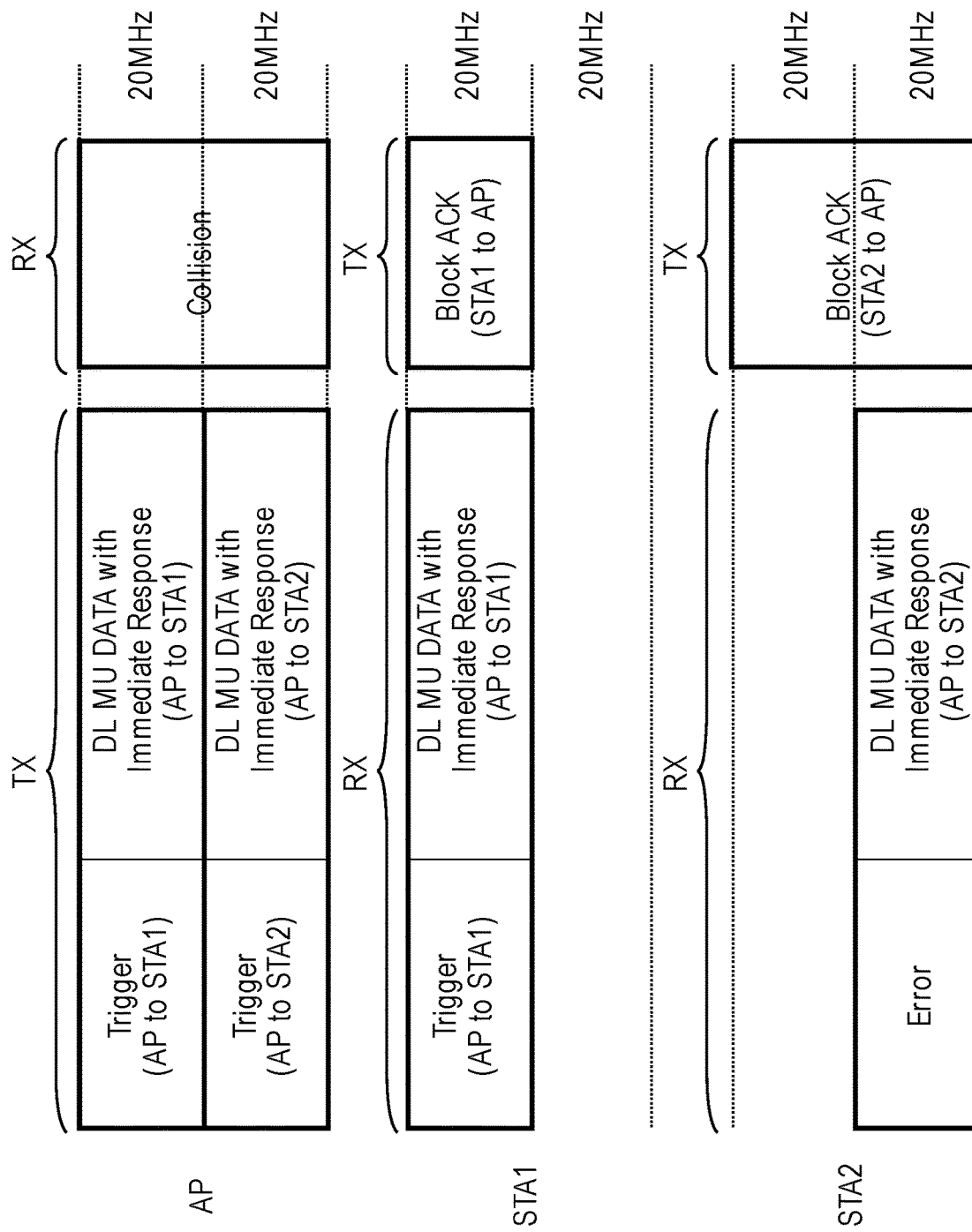
FIG. 3 is a diagram illustrating a problem that can occur during an MU acknowledgement procedure, according to some embodiments.

FIG. 3 is a diagram illustrating a problem that can occur during an MU acknowledgement procedure, according to some embodiments. The AP transmits a trigger frame and a data frame to each of STA1 and STA2 during a DL MU transmission (e.g., in a DL MU PPDU). The trigger frame and data frame intended for STA1 are transmitted in a first 20 MHz sub-channel and the trigger frame and data frame intended for STA2 are transmitted in a second 20 MHz sub-channel. Each trigger frame includes trigger information for a UL MU transmission. The presence of the trigger frames elicits a UL MU transmission. Each data frame includes an ACK Policy field that is set to indicate that an immediate acknowledgement is requested (e.g., an Implicit Block ACK Request acknowledgement policy).

In this example, STA1 successfully receives and decodes trigger information included in the trigger frame (transmitted by the AP to STA1), and thus transmits a Block ACK frame to the AP in an MU manner during the UL MU transmission. However, in this example, STA2 fails to successfully decode trigger information included in the trigger frame (transmitted by the AP to STA2). As a result, STA2 ends up transmitting a Block ACK frame to the AP in an SU manner, which collides with the Block ACK frame transmitted by STA1 during the UL MU transmission. Embodiments described herein address this problem by introducing the concept of a trigger-based immediate acknowledgement. An MU acknowledgement procedure that utilizes a trigger-based immediate acknowledgement to avoid such collisions is described with reference to FIG. 4.

Figure 4:
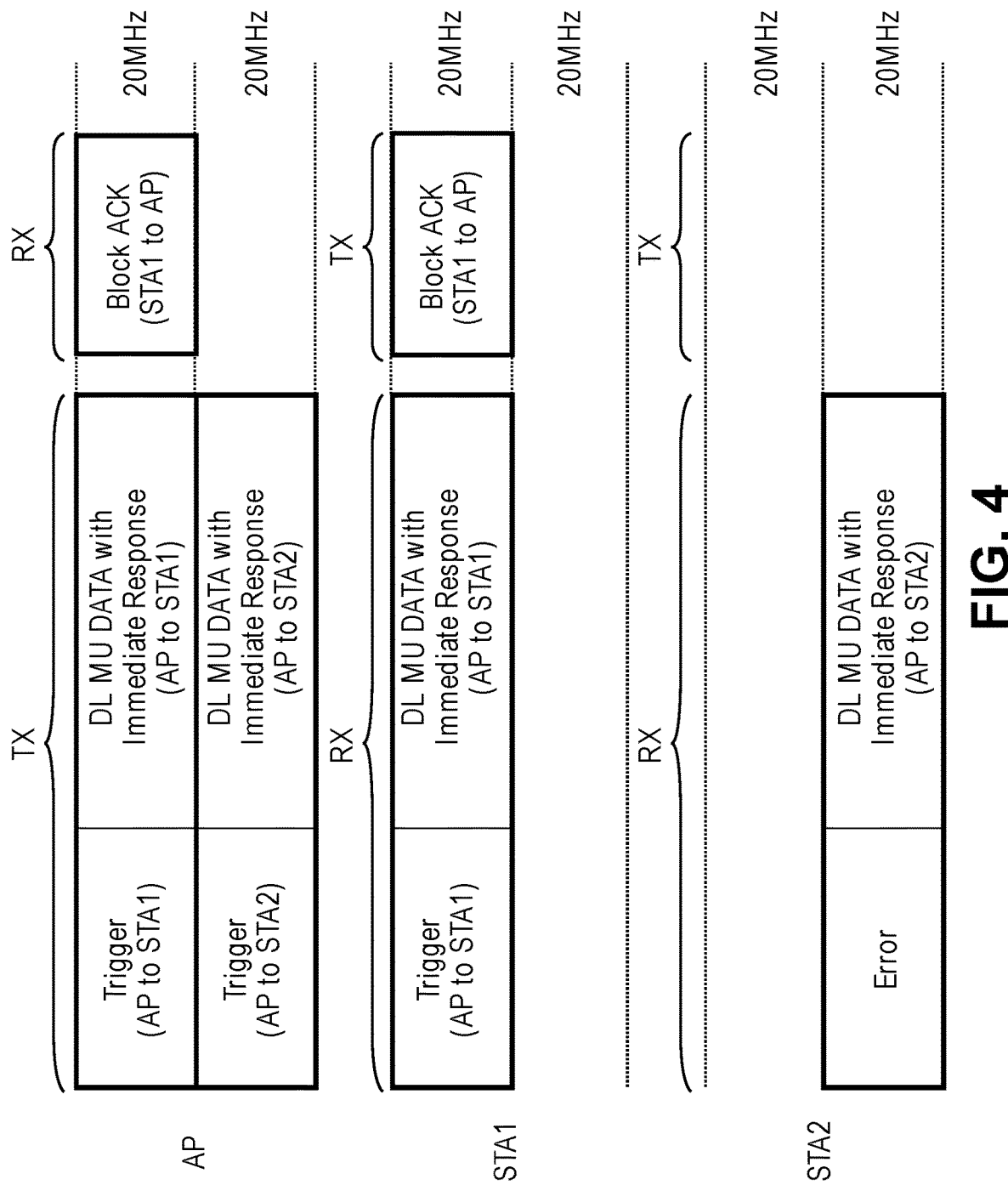
FIG. 4 is a diagram illustrating operations of an MU acknowledgement procedure that utilizes a trigger-based immediate acknowledgement, according to some embodiments.

FIG. 4 is a diagram illustrating operations of an MU acknowledgement procedure that utilizes a trigger-based immediate acknowledgement, according to some embodiments. The AP transmits a trigger frame and data frame to each of STA1 and STA2 during a DL MU transmission (e.g., in a DL MU PPDU). The trigger frame and data frame intended for STA1 are transmitted in a first 20 MHz sub-channel and the trigger frame and data frame intended for STA2 are transmitted in a second 20 MHz sub-channel. Each trigger frame includes trigger information for a UL MU transmission. In one embodiment, each data frame includes an indication that the recipient (e.g., STA1 or STA2 in this example) should provide a trigger-based immediate acknowledgement. In one embodiment, this indication is included in an ACK Policy field of the data frame. For example, the ACK Policy field of the data frame may be set to a binary value of '01' to indicate that the recipient should provide a trigger-based immediate acknowledgement (binary value of '01' is normally used for PSMP operation, but PSMP may not be used so this value can be re-purposed to indicate trigger-based immediate acknowledgement). With a trigger-based immediate acknowledgement, a STA that successfully decodes trigger information for a UL MU transmission from a DL MU PPDU transmitted by an AP transmits an acknowledgement frame to the AP in an MU manner during the UL MU transmission, according to the trigger information (e.g., using an allocated transmission resource). On the other hand, a STA that fails to successfully decode trigger information from a DL MU PPDU transmitted by an AP refrains from transmitting an acknowledgement frame to the AP (at least until after the UL MU transmission has finished).

In this example, STA1 successfully receives and decodes trigger information included in the trigger frame (transmitted by the AP to STA1), and thus transmits a Block ACK frame to the AP in an MU manner during the UL MU transmission. However, in this example, STA2 fails to successfully decode trigger information included in the trigger frame (transmitted by the AP to STA2). According to a trigger-based immediate acknowledgement policy, STA2 determines whether it has successfully decoded trigger information from the DL MU PPDU (e.g., from the trigger frame in the DL MU PPDU). In this example, STA2 determines that it has failed to successfully decode trigger information from the DL MU PPDU. As such, STA2 refrains from transmitting an acknowledgement frame to the AP. In this way, collisions (e.g., the collision described with reference to FIG. 3) can be avoided.

In the example described above, trigger information is included in a trigger frame in the DL MU PPDU. It should be understood, however, that trigger information can be included in a MAC header of a data frame or elsewhere within the DL MU PPDU.

In the examples described above, an AP implicitly requested an immediate acknowledgement from a STA (e.g., by setting ACK Policy field of a data frame). In one embodiment, an AP may explicitly request an immediate acknowledgement from a STA by transmitting a Block ACK Request frame to the STA in a DL MU PPDU. A similar problem as described above (e.g., collision) can also occur when a Block ACK Request frame is used to request an immediate acknowledgement from a STA. Embodiments in which the Block ACK Request frame is used to request an immediate acknowledgement from a STA will now be described.

FIG. 5 is a diagram illustrating operations of an MU acknowledgement procedure, where a Block ACK Request frame elicits an immediate acknowledgement, according to some embodiments. The AP transmits a data frame to each of STA1 and STA2 during a DL MU transmission (e.g., in a DL MU PPDU—which may be a DL OFDMA PPDU). Each data frame has its ACK Policy field set to indicate a Block ACK acknowledgement policy (e.g., ACK Policy field is set to a binary value of '11'). The AP also transmits a Block ACK Request frame to STA1 during the DL MU transmission. The Block ACK Request frame and data frame intended for STA1 are transmitted in a first 20 MHz sub-channel and the data frame intended for STA2 is transmitted in a second 20 MHz sub-channel. The Block ACK Request frame elicits an immediate acknowledgement from STA1 in an SU manner. As such, following the DL MU transmission, STA1 transmits a Block ACK frame to the AP in an SU manner. The AP then transmits a Block ACK Request frame to STA2, which elicits an immediate acknowledgement from STA2 in an SU manner. As such, upon receiving the Block ACK Request frame from the AP, STA2 transmits a Block ACK frame to the AP.

FIG. 6 is a diagram illustrating operations of an MU acknowledgement procedure, where a trigger frame elicits a UL MU transmission and a Block ACK Request frame and an ACK Policy field of a data frame elicit an immediate acknowledgement, according to some embodiments. The AP transmits a trigger frame, a Block ACK Request frame, and a data frame to each of STA1 and STA2 during a DL MU transmission (e.g., in a DL MU PPDU). The trigger frame, Block ACK Request frame, and data frame intended for STA1 are transmitted in a first 20 MHz sub-channel and the trigger frame, Block ACK Request frame, and data frame intended for STA2 are transmitted in a second 20 MHz sub-channel. Each trigger frame includes trigger information for a UL MU transmission. The presence of the trigger frames elicits a UL MU transmission. Each data frame has its ACK Policy field set to indicate a Block ACK acknowledgement policy (e.g., ACK Policy field is set to a binary value of '11'). The presence of the Block ACK Request frames in combination with the setting of the ACK Policy fields of the data frames (to indicate a Block ACK acknowledgement policy) elicits an immediate acknowledgement from the STAs. As such, each of STA1 and STA2 transmits a Block ACK frame to the AP in an MU manner during the UL MU transmission (e.g., in a UL MU PPDU—which may be a UL OFDMA PPDU), according to the trigger information (e.g., using the transmission resource assigned to the STA). In one embodiment, a STA (e.g., STA1 or STA2) may transmit additional frames (e.g., one or more data frames) during the UL MU transmission (if time permits).

Figure 7:
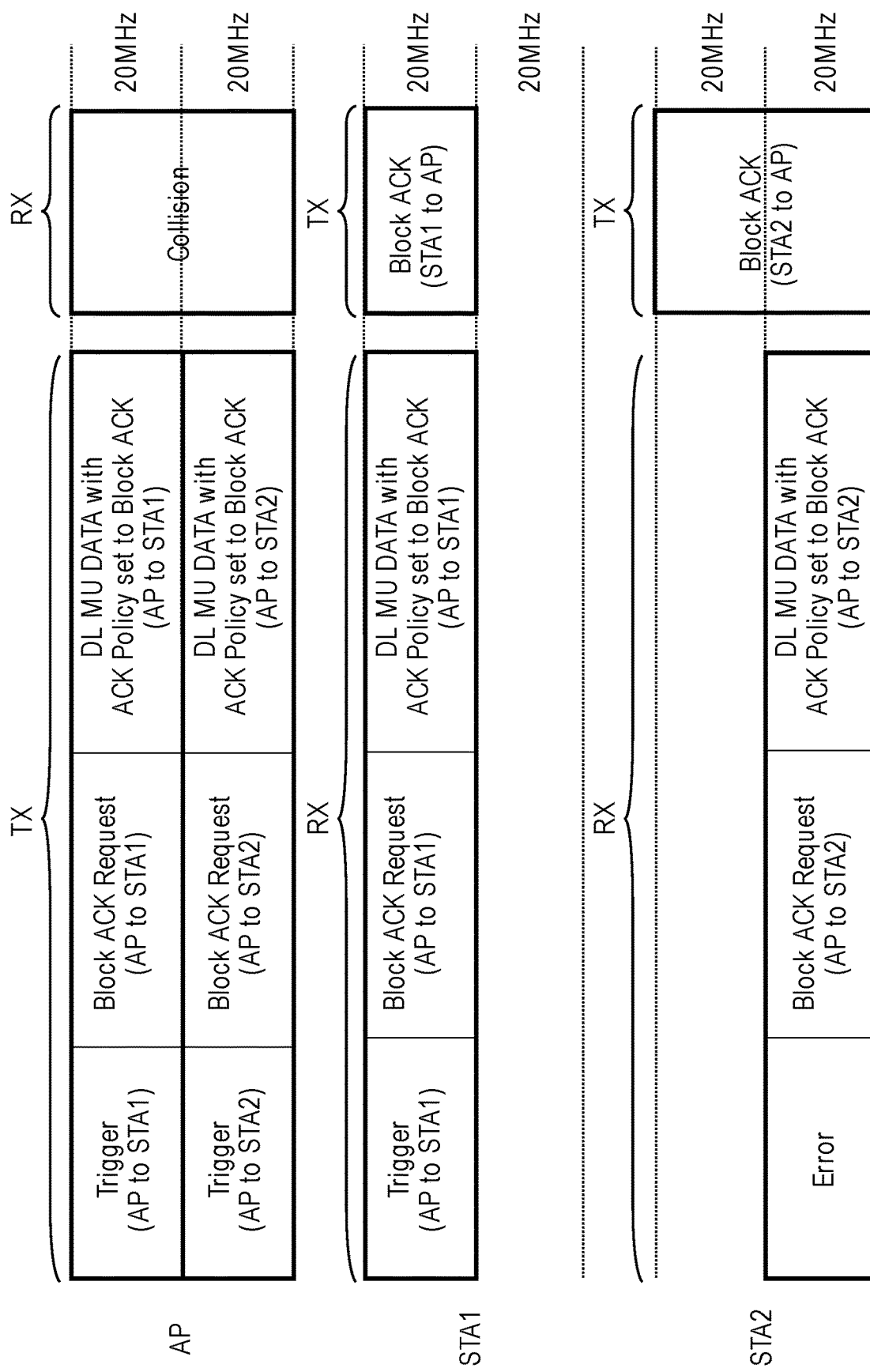
FIG. 7 is a diagram illustrating a problem that can occur during an MU acknowledgement procedure, according to some embodiments.

FIG. 7 is a diagram illustrating a problem that can occur during an MU acknowledgement procedure, according to some embodiments. The AP transmits a trigger frame, a Block ACK Request frame, and a data frame to each of STA1 and STA2 during a DL MU transmission (e.g., in a DL MU PPDU). The trigger frame, Block ACK Request frame, and data frame intended for STA1 are transmitted in a first 20 MHz sub-channel and the trigger frame, Block ACK Request frame, and data frame intended for STA2 are transmitted in a second 20 MHz sub-channel. Each trigger frame includes trigger information for a UL MU transmission. The presence of the trigger frames elicits a UL MU transmission. Each data frame has its ACK Policy field set to indicate a Block ACK acknowledgement policy (e.g., ACK Policy field is set to a binary value of '11'). The presence of the Block ACK Request frames in combination with the setting of the ACK Policy fields of the data frames (to indicate a Block ACK acknowledgement policy) elicits an immediate acknowledgement from the STAs.

In this example, STA1 successfully receives and decodes trigger information included in the trigger frame (transmitted by the AP to STA1), and thus transmits a Block ACK frame to the AP in an MU manner during the UL MU transmission. However, in this example, STA2 fails to successfully decode trigger information included in the trigger frame (transmitted by the AP to STA2). As a result, STA2 ends up transmitting a Block ACK frame to the AP in an SU manner, which collides with the Block ACK frame transmitted by STA1 during the UL MU transmission. Embodiments described herein address this problem by introducing the concept of a trigger-based immediate acknowledgement. An MU acknowledgement procedure that utilizes a trigger-based immediate acknowledgement to avoid such collisions is described with reference to FIG. 8.

Figure 8:
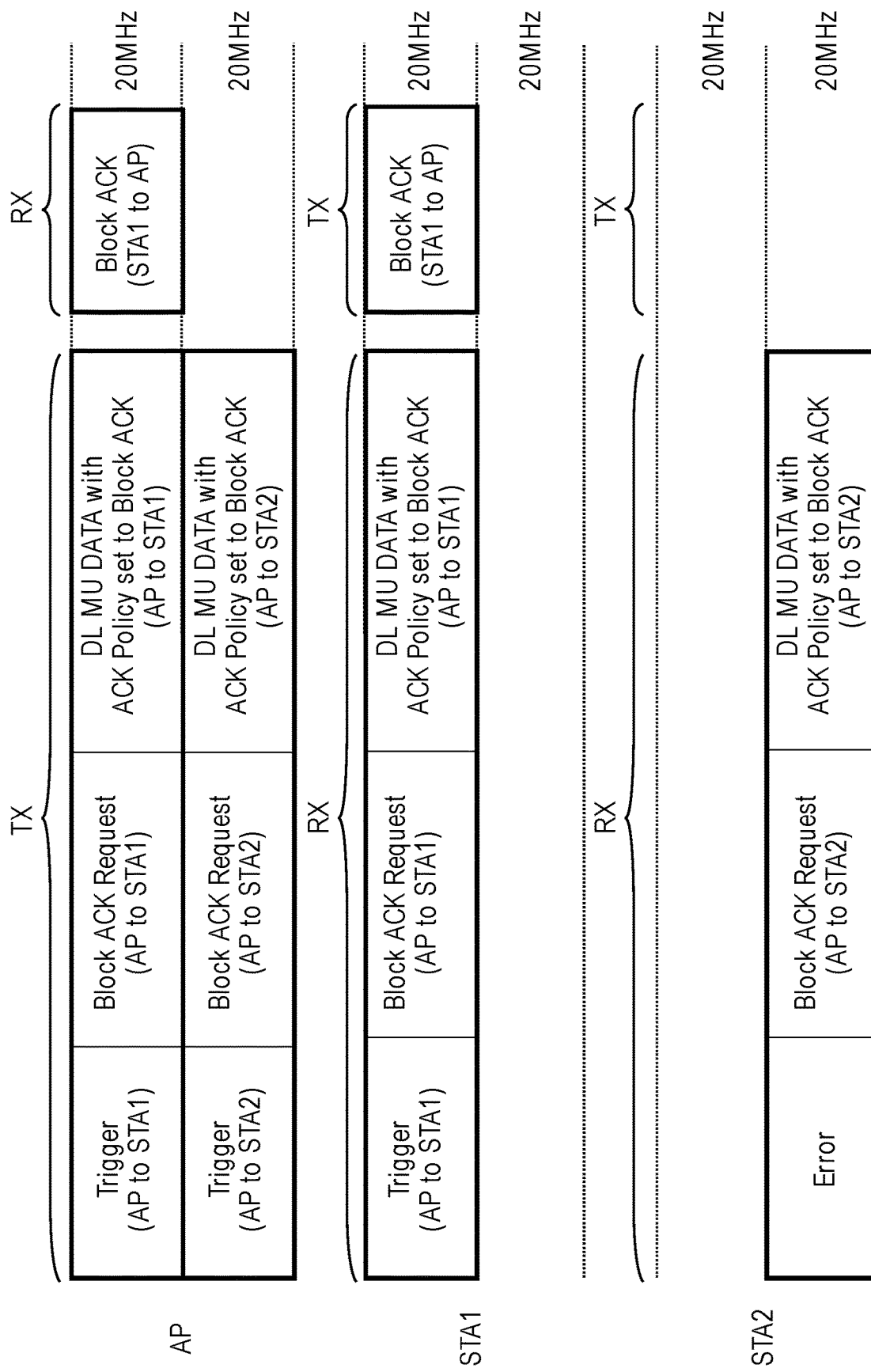
FIG. 8 is a diagram illustrating operations of an MU acknowledgement procedure that utilizes a trigger-based immediate acknowledgement, according to some embodiments.

FIG. 8 is a diagram illustrating operations of an MU acknowledgement procedure that utilizes a trigger-based immediate acknowledgement, according to some embodiments. The AP transmits a trigger frame, a Block ACK Request frame, and a data frame to each of STA1 and STA2 during a DL MU transmission (e.g., in a DL MU PPDU). The trigger frame, Block ACK Request frame, and data frame intended for STA1 are transmitted in a first 20 MHz sub-channel and the trigger frame, Block ACK Request frame, and data frame intended for STA2 are transmitted in a second 20 MHz sub-channel. Each trigger frame includes trigger information for a UL MU transmission. In one embodiment, each Block ACK Request frame includes an indication that the recipient (e.g., STA1 or STA2 in this example) should provide a trigger-based immediate acknowledgement. In one embodiment, this indication is included in a Block ACK Request (BAR) ACK Policy field of the Block ACK Request frame. For example, the BAR ACK Policy field of the Block ACK Request frame may be set to a binary value of '1' to indicate that the recipient should provide a trigger-based immediate acknowledgement (binary value of '1' is normally used for PSMP operation, but PSMP may not be used so this value can be re-purposed to indicate trigger-based immediate acknowledgement). Each data frame has its ACK Policy field set to indicate a Block ACK acknowledgement policy (e.g., ACK Policy field is set to a binary value of '11'). With a trigger-based immediate acknowledgement, a STA that successfully decodes trigger information for a UL MU transmission from a DL MU PPDU transmitted by an AP transmits an acknowledgement frame to the AP in an MU manner during the UL MU transmission, according to the trigger information (e.g., using an allocated transmission resource). On the other hand, a STA that fails to successfully decode trigger information from a DL MU PPDU transmitted by an AP refrains from transmitting an acknowledgement frame to the AP (at least until after the UL MU transmission has finished).

In this example, STA1 successfully receives and decodes trigger information included in the trigger frame (transmitted by the AP to STA1), and thus transmits a Block ACK frame to the AP in an MU manner during the UL MU transmission. However, in this example, STA2 fails to successfully decode trigger information included in the trigger frame (transmitted by the AP to STA2). According to a trigger-based immediate acknowledgement policy, STA2 determines whether it has successfully decoded trigger information from the DL MU PPDU (e.g., from the trigger frame in the DL MU PPDU). In this example, STA2 determines that it has failed to successfully decode trigger information from the DL MU PPDU. As such, STA2 refrains from transmitting an acknowledgement frame to the AP. In this way, collisions (e.g., the collision described with reference to FIG. 7) can be avoided.

In the example described above, trigger information is included in a trigger frame in the DL MU PPDU. It should be understood, however, that trigger information can be included in a MAC header of a data frame or elsewhere within the DL MU PPDU. For example, in one embodiment, trigger information is included in a Block ACK Request frame. Such frame is referred to herein as an MU Block ACK Request frame (or MU-BAR frame).

FIG. 9 is a diagram illustrating operations of an MU acknowledgement procedure, where an MU Block ACK Request frame elicits an immediate acknowledgement, according to some embodiments. The AP transmits an MU Block ACK Request frame and a data frame to each of STA1 and STA2 during a DL MU transmission (e.g., in a DL MU PPDU). The MU Block ACK Request frame and data frame intended for STA1 are transmitted in a first 20 MHz sub-channel and the MU Block ACK Request frame and data frame intended for STA2 are transmitted in a second 20 MHz sub-channel. Each MU Block ACK Request frame includes trigger information for a UL MU transmission. Each data frame has its ACK Policy field set to indicate a Block ACK acknowledgement policy (e.g., ACK Policy field is set to a binary value of '11'). The presence of the MU Block ACK Request frames elicits an immediate acknowledgement from the STAs in an MU manner. As such, each of STA1 and STA2 transmits a Block ACK frame to the AP in an MU manner during the UL MU transmission (e.g., in a UL MU PPDU—which may be a UL OFDMA PPDU), according to the trigger information (e.g., using the transmission resource assigned to the STA). In one embodiment, a STA (e.g., STA1 or STA2) may transmit additional frames (e.g., one or more data frames) during the UL MU transmission (if time permits). In one embodiment, an AP may transmit a Block ACK Request frame (normal non-MU Block ACK Request frame) to a STA to elicit an immediate acknowledgement from the STA in an SU manner and the AP may transmit an MU Block ACK frame to a STA to elicit an immediate acknowledgement from the STA in an MU manner.

Figure 10:
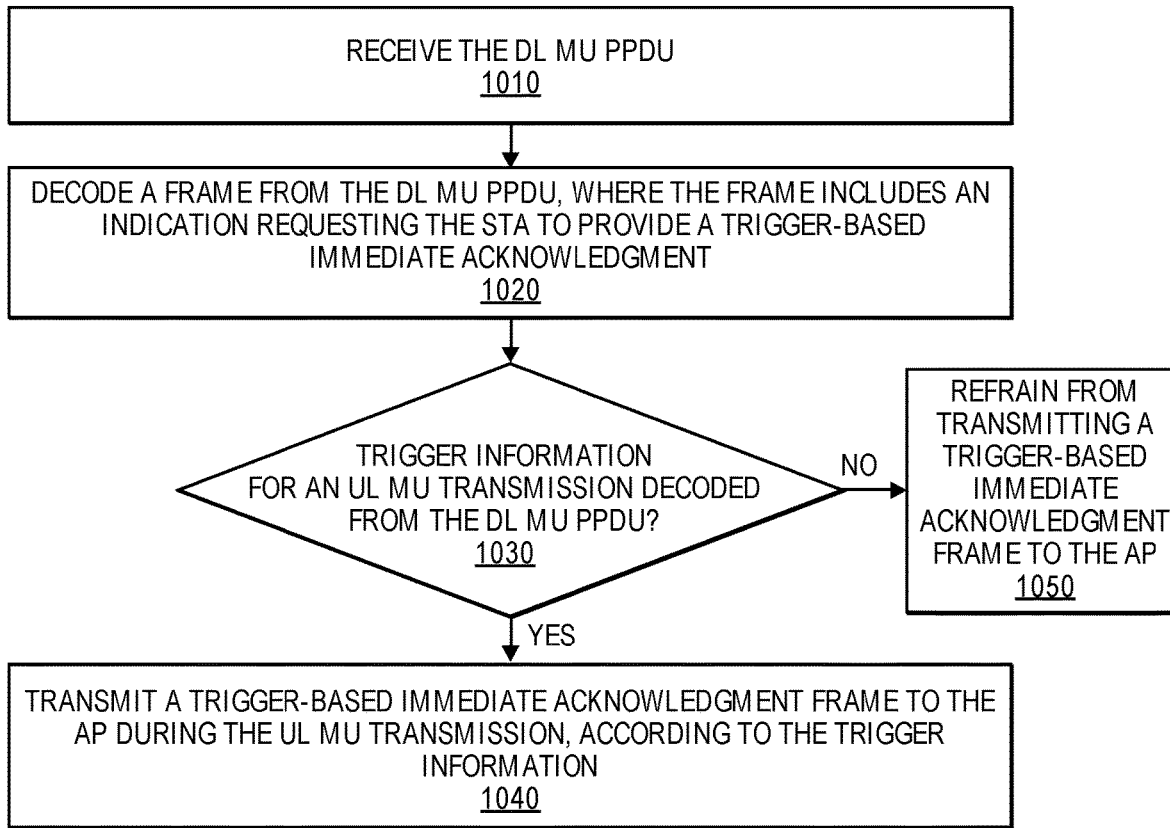
FIG. 10 is a flow diagram of a process implemented by a network device functioning as a non-AP STA for acknowledging a DL MU PPDU transmitted by an AP, according to some embodiments.

FIG. 10 is a flow diagram of a process implemented by a network device functioning as a non-AP STA for acknowledging a DL MU PPDU transmitted by an AP, according to some embodiments. In one embodiment, the operations of the flow diagram may be performed by a network device functioning as non-AP STA in a wireless communications network (e.g., a WLAN). The operations in this flow diagram and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the STA receives a DL MU PPDU from the AP (block 1010). The STA decodes a frame from the DL MU PPDU, where the frame includes an indication requesting the STA to provide a trigger-based immediate acknowledgement (block 1020). In one embodiment, the frame is a data frame. In one embodiment, the indication requesting the STA to provide a trigger-based immediate acknowledgement is included in an ACK Policy field of the frame. In one embodiment, the ACK Policy field is set to a binary value of '01' to request that the STA provide a trigger-based immediate acknowledgement. In one embodiment, the frame is a Block ACK Request frame. In one embodiment, the indication requesting the STA to provide a trigger-based immediate acknowledgement is included in a Block ACK Request (BAR) ACK Policy field of the Block ACK Request frame. In one embodiment, the BAR ACK Policy field is set to a binary value of '1' to request that the STA provide a trigger-based immediate acknowledgement. In one embodiment, the frame is an MU Block ACK Request frame.

The STA determines whether trigger information for a UL MU transmission has been (successfully) obtained (e.g., successfully decoded) from the DL MU PPDU (decision block 1030). In one embodiment, the trigger information for the UL MU transmission includes information regarding an allocation of transmission resources for the UL MU transmission. If the STA determines that it has obtained trigger information from the DL MU PPDU, then the STA transmits a trigger-based immediate acknowledgement frame to the AP (e.g., during the UL MU transmission), according to the trigger information (e.g., transmitting the trigger-based immediate acknowledgement frame by using a transmission a transmission resource allocated to the STA) (block 1040). In one embodiment, the STA transmits the trigger-based immediate acknowledgement frame to the AP a short inter frame space (SIFS) after receiving the DL MU PPDU. On the other hand, if the STA determines that it has failed to obtain trigger information from the DL MU PPDU, then the STA refrains from transmitting the trigger-based immediate acknowledgement frame to the AP (block 1050). In one embodiment, if the STA determines that it has failed to obtain trigger information from the DL MU PPDU, the STA waits for a Block ACK Request frame for the frame from the AP and transmits an acknowledgement frame for the frame to the AP in response to receiving the Block ACK Request frame. In one embodiment, if the STA determines that it has failed to obtain trigger information from the DL MU PPDU, the STA transmits an acknowledgement frame to the AP during a subsequent transmission opportunity (e.g., TXOP), before it receives a Block ACK Request frame from the AP.

Figure 11:
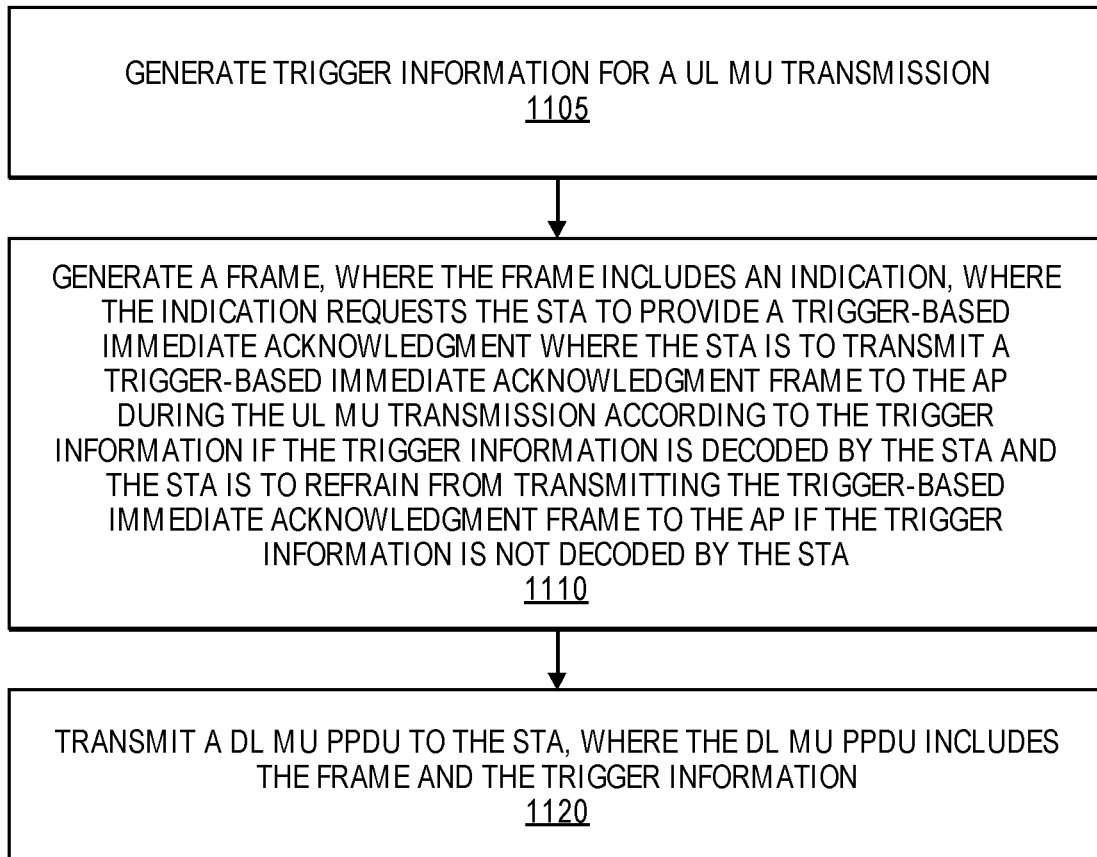
FIG. 11 is a flow diagram of a process implemented by a network device functioning as an AP for eliciting a trigger-based immediate acknowledgement from a STA, according to some embodiments.

FIG. 11 is a flow diagram of a process implemented by a network device functioning as an AP for eliciting a trigger-based immediate acknowledgement from a STA, according to some embodiments. In one embodiment, the operations of the flow diagram may be performed by a network device functioning as an AP in a wireless communications network (e.g., a WLAN).

The AP generates trigger information for a UL MU transmission (block 1105). In one embodiment, the trigger information for the UL MU transmission includes information regarding an allocation of transmission resources for the UL MU transmission. The AP generates a frame, where the frame includes an indication, wherein the indication requests the STA to provide a trigger-based immediate acknowledgement where the STA is to transmit a trigger-based immediate acknowledgement frame to the AP (e.g., during the UL MU transmission) according to the trigger information if the trigger information is obtained (e.g., successfully decoded) by the STA and the STA is to refrain from transmitting the trigger-based immediate acknowledgement frame to the AP if the trigger information is not obtained by the STA (block 1110). In one embodiment, the frame is a data frame. In one embodiment, the indication requesting the STA to provide a trigger-based immediate acknowledgement is included in an ACK Policy field of the frame. In one embodiment, the ACK Policy field is set to a binary value of '01' to request that the STA provide a trigger-based immediate acknowledgement. In one embodiment, the frame is a Block ACK Request frame. In one embodiment, the indication requesting the STA to provide a trigger-based immediate acknowledgement is included in a Block ACK Request (BAR) ACK Policy field of the Block ACK Request frame. In one embodiment, the BAR ACK Policy field is set to a binary value of '1' to request that the STA provide a trigger-based immediate acknowledgement. In one embodiment, the frame is an MU Block ACK Request frame. The STA then transmits a DL MU PPDU to the STA, where the DL MU PPDU includes the frame and the trigger information (block 1120).

As mentioned above, in one embodiment, trigger information can be included in a trigger frame in a DL MU PPDU. In one embodiment, multiple frames, including the trigger frame, can be included in a DL MU PPDU by aggregating the frames (e.g., Mac Protocol Data Units (MPDUs)) in an aggregate MPDU (A-MPDU). In one embodiment, at most one frame that includes trigger information can be included in the A-MPDU. In one embodiment, the frame that includes the trigger information should be the first frame or last frame in the A-MPDU. In one embodiment, the ACK Policy field of other frames in the A-MPDU should not be set to indicate a Normal ACK acknowledgement policy, Implicit Block ACK Request acknowledgement policy, or a Block ACK acknowledgement policy. The ACK Policy field of a data frame in the A-MPDU may be set to a reserved value (e.g., binary value of '01') to indicate that the recipient should provide a trigger-based immediate acknowledgement. In this case, the acknowledgement behavior of the recipient depends on whether the recipient is able to successfully receive and decode the trigger information (e.g., from the trigger frame or other frame in the A-MPDU). For example, when a frame in a DL MU PPDU includes an indication that the recipient should provide a trigger-based immediate acknowledgement (e.g., ACK Policy field of the data frame is set to a binary value of '01'), the acknowledgement behavior of the recipient can be as follows:

ACK Policy Set to 01: PSMP Context or UL OFDMA Context

In a frame that is in the PSMP context
  i) When bit 6 of the Frame Control field is set to 1:
    There may be a response frame to the frame that is received, but it is neither the ACK frame nor any Data frame of subtype+CF-ACK. The ACK Policy subfield for QoS CF-Poll and QoS CF-ACK+CF-Poll Data frames is set to this value.
  ii) When bit 6 of the Frame Control field is set to 0:
    The acknowledgment for a frame indicating PSMP ACK when it appears in a PSMP downlink transmission time (PSMP-UTT) is to be received in a later PSMP uplink transmission time (PSMP-UTT). The acknowledgment for a frame indicating PSMP ACK when it appears in a PSMP-UTT is to be received in a later PSMP-DTT.

In a frame that is in the UL OFDMA context
  i) The addressed recipient that receives a frame having the sub-channel assignment information returns an ACK/Block ACK frame, either individually or as part of an A-MPDU starting a SIFS after the PPDU carrying the frame, according to the sub-channel assignment information specified in the received frame.
  ii) The addressed recipient that does not receive a frame having the sub-channel assignment information takes no action upon the receipt of the frame except for recording the state. The recipient can expect a Block ACK Request frame in the future to which it responds using the procedure described in Block acknowledgment mechanism. But, before receiving a Block ACK Request frame in the future, when the addressed recipient obtains a TXOP, it can return an ACK/Block ACK frame in an unsolicited manner. This unsolicited ACK/Block ACK frame transmission is similar to the delayed block ACK policy. Through the ACK Policy field, the addressed recipient knows that it is requested to return an ACK/Block ACK frame. But, because of a loss of the sub-channel assignment information, the addressed recipient cannot return an ACK/Block ACK frame. So, when the addressed recipient obtains a new TXOP later, it can return an ACK/Block ACK frame for avoiding an unnecessary retransmission from the AP.

As mentioned above, in one embodiment, trigger information can be included in a MAC header of a frame in a DL PPDU. In this case, in one embodiment, the ACK Policy field of a data frame in the A-MPDU must be set to indicate a Normal ACK acknowledgement policy or Implicit Block ACK Request acknowledgement policy. In one embodiment, trigger information in the MAC header of all frames in an A-MPDU have the same information. In one embodiment, when the ACK Policy field of a data frame in the A-MPDU is set to indicate a No ACK acknowledgement policy, then a transmission resource assignment information for the recipient of that data frame is not included in the trigger information.

As mentioned above, in one embodiment, trigger information can be included in an MU Block ACK Request frame. In one embodiment, the MU Block ACK Request frame may have the following format:

| Frame Control | Duration/ID | RA | TA | BAR Control | Per-User Block ACK Request | Per-User Sub-channel Assignment |
|---|---|---|---|---|---|---|
| 2 octets | 2 octets | 6 octets | 6 octets | 2 octets | Variable (Repeated for each user) | |

The BAR Control field includes the number of users from which an immediate acknowledgement is requested. The Per-User Block ACK Request field and the Per-User Sub-channel Assignment field is repeated for each user. A recipient of the Multi-User Block ACK Request frame responds with an ACK frame or Block ACK frame that is transmitted during the UL MU transmission, according to the sub-channel assignment indicated in the Per-User Sub-Channel Assignment field. One or more MU Block ACK Request frames can be included in the DL MU PPDU. However, since the normal (non-MU) Block ACK Request frame can still be used to request an ACK frame or Block ACK frame that is transmitted in an SU manner, in one embodiment, an MU Block ACK Request frame and a normal Block ACK Request frame should not be present in the same DL MU PPDU together. An MU Block ACK Request frame can be included in an A-MPDU (with other frames). In this case, in one embodiment, the MU Block ACK Request frame should be the first or last frame in the A-MPDU.

In one embodiment, at most one frame that includes trigger information can be included in an A-MPDU. In one embodiment, when a Block ACK Request frame is included in an A-MPDU, the ACK Policy field of the data frames in the A-MPDU should be set to Block ACK (since a Block ACK Request frame is also present in the A-MPDU). In one embodiment, the BAR ACK Policy field of the Block ACK Request frame in the A-MPDU should not bet set to a binary value of '0' (Normal ACK), but should be set to a reserved value (e.g., binary value of '1') to indicate that the recipient should provide a trigger-based immediate acknowledgement. In this case, the acknowledgement behavior of the recipient depends on whether the recipient is able to successfully receive and decode the trigger information (e.g., from a trigger frame or other frame in the A-MPDU). For example, when a Block ACK Request frame in a DL MU PPDU includes an indication that the recipient should provide a trigger-based immediate acknowledgement (e.g., BAR ACK Policy field of the Block ACK Request frame is set to a binary value of ' 1'), the acknowledgement behavior of the recipient can be as follows:

BAR ACK Policy Set to 1: PSMP Context or UL OFDMA Context

In a frame that is in the PSMP context i) No Acknowledgement.

The addressee sends no immediate response upon receipt of the frame. The BAR ACK Policy subfield is set to this value when the sender does not require immediate acknowledgment. The value 1 is not used in a basic Block ACK Request frame outside a PSMP sequence. The value 1 is not used in a Multi-TID Block ACK Request frame.

In a frame that is in the UL OFDMA context i) The addressed recipient that receives a frame having the sub-channel assignment information returns an ACK/Block ACK frame, either individually or as part of an A-MPDU starting a SIFS after the PPDU carrying the frame, according to the sub-channel assignment information specified in the received frame.

ii) The addressed recipient that does not receive a frame having the sub-channel assignment information takes no action upon the receipt of the frame except for recording the state. The recipient can expect a Block ACK Request frame in the future to which it responds using the procedure described in Block acknowledgment mechanism.

In one embodiment, when a Block ACK Request frame in a DL MU PPDU includes an indication that the recipient should provide an immediate acknowledgement in SU manner (e.g., BAR ACK Policy field of the Block ACK Request frame is set to a binary value of '0'), the acknowledgement behavior of the recipient can be as follows:

BAR ACK Policy Set to 0: PSMP Context or SU Context

In a frame that is in the PSMP context i) Normal Acknowledgment.

The BAR ACK Policy subfield is set to this value when the sender requires immediate acknowledgment. The addressee returns an ACK frame (per PSMP acknowledgment rules).

In a frame that is in the SU context i) The addressed recipient returns a Block ACK frame, either individually or as part of an A-MPDU starting a SIFS after the PPDU carrying the frame.

In one embodiment, MU acknowledgement behavior is as follows. At most one of the following frames can be present in an A-MPDU for each intended recipient of a DL MU PPDU: i) one or more QoS data frames with ACK Policy field set to indicate an Implicit Block ACK Request acknowledgement policy; ii) one or more QoS data frames with ACK Policy field set to indicate that the recipient should provide a trigger-based immediate acknowledgement (e.g., ACK Policy field is set to a binary value of '01'); iii) a Block ACK Request frame; and iv) an MU Block ACK Request frame.

In one embodiment, a DL MU PPDU should not include more than one A-MPDU that includes one or more of the following frames that elicit an immediate acknowledgement in SU manner: i) one or more QoS data frames with ACK Policy field set to indicate an Implicit Block ACK Request acknowledgement policy; and ii) a Block ACK Request frame.

In one embodiment, a DL MU PPDU may include more than one A-MPDU that includes one or more of the following frames that elicit an immediate acknowledgement in MU manner: i) one or more QoS data frames with the ACK Policy field set to indicate that the recipient should provide a trigger-based immediate acknowledgement (e.g., ACK Policy field is set to a binary value of '01'); and ii) an MU Block ACK Request frame.

In one embodiment, when a DL MU PPDU includes an A-MPDU that includes a QoS data frame with ACK Policy field set to indicate an Implicit Block ACK Request acknowledgement policy or a Block ACK Request frame, then the following frames cannot be present in the DL MU PPDU: i) one or more QoS data frames with the ACK Policy field set to indicate that the recipient should provide a trigger-based immediate acknowledgement (e.g., ACK Policy field is set to a binary value of '01'); and ii) an MU Block ACK Request frame.

In one embodiment, when the ACK Policy field of a data frame in an UL MU PPDU (transmitted from a STA to an AP) is set to indicate an Implicit Block ACK Request acknowledgement policy (e.g., ACK Policy field is set to a binary value of '00'), the AP may respond by transmitting an ACK frame or Block ACK frame to the STA in either an SU manner or MU manner (it is up to the AP to decide). This means that the acknowledgement behavior can be different depending on the direction of transmission (e.g., UL MU transmission vs. DL MU transmission). In one embodiment, the acknowledgement behavior can be summarized as follows in Table 2:

TABLE 2

| ACK Policy | Immediate Response Type of DL MU PPDU | Immediate Response Type of UL MU PPDU |
|---|---|---|
| bits: 00 | SU PPDU | SU PPDU or MU PPDU |
| bits: 01 | MU PPDU | Not allowed |

In one embodiment, one or more Block ACK Request frames may be present in an UL MU PPDU. In one embodiment, a normal (non-MU) Block ACK Request frame included in an UL MU PPDU elicits an immediate acknowledgement from the AP in either an SU manner or MU manner (it is up to the AP to decide). In one embodiment, the acknowledgement behavior with respect to a Block ACK Request frame can be summarized as follows in Table 3:

TABLE 3

| Block ACK Request Type | Immediate Response Type of DL MU PPDU | Immediate Response Type of UL MU PPDU |
|---|---|---|
| Normal Block ACK Request | SU PPDU | SU PPDU or MU PPDU |
| Multi-User Block ACK Request | MU PPDU | Not allowed |

Figure 12:
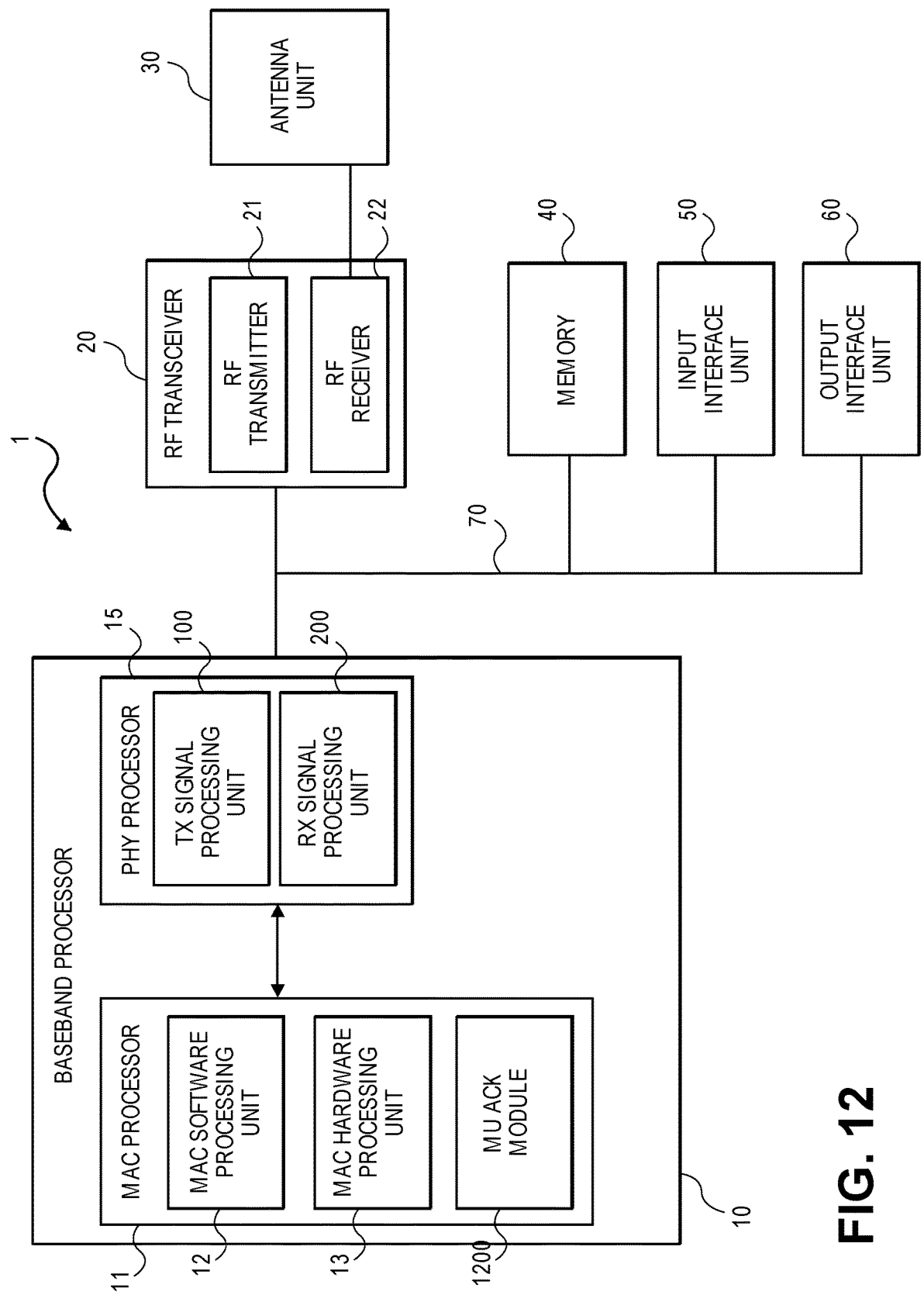
FIG. 12 is a block diagram of a network device implementing a STA or AP that executes an MU acknowledgement process and module, according to some embodiments.
Figure 13:
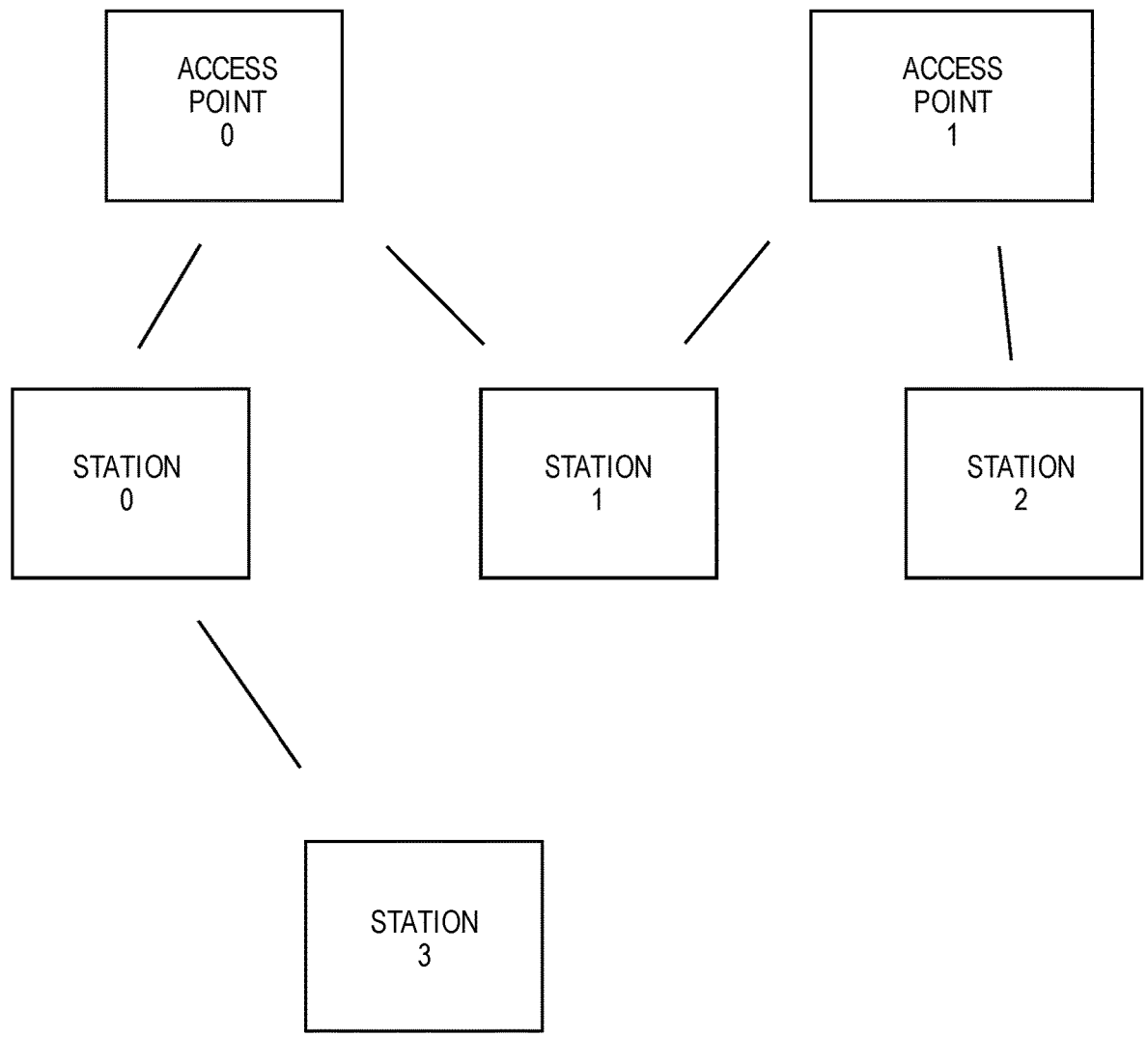
FIG. 13 is a block diagram of a WLAN, according to some embodiments.

FIG. 12 is a block diagram of a network device implementing a STA or AP that executes an MU acknowledgement process and module, according to some embodiments. In a wireless local area network (WLAN) such as the example WLAN illustrated in FIG. 13, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 13) and the other WLAN devices may be non-AP stations (non-AP STAs), (e.g., stations 0-3 in FIG. 13). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 13, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements an MU acknowledgement (ACK) module 1200. The MU acknowledgement module 1200 can implement the respective functions for any combination of the embodiments described herein above with regard to FIGS. 1-13. In other embodiments, the MU acknowledgement module 1200 may be implemented by or distributed over both the PHY processor 15 and the MAC processor 11. The MU acknowledgement module 1200 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 14:
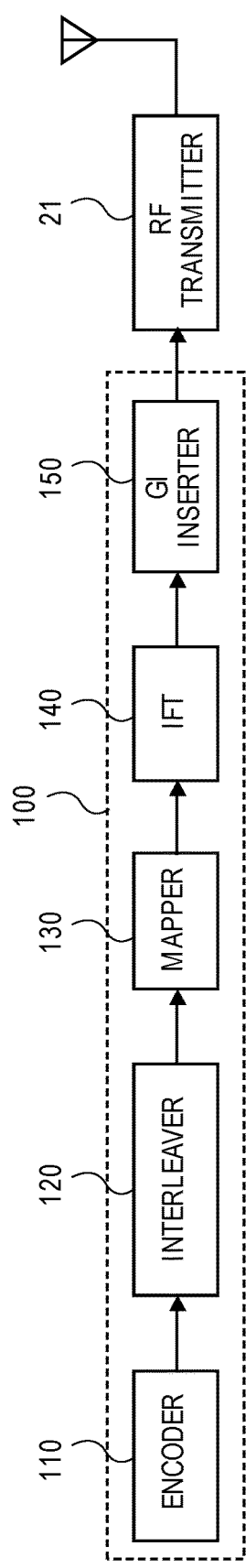
FIG. 14 is a schematic block diagram exemplifying a transmitting signal processor in a WLAN device, according to some embodiments.

FIG. 14 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 15:
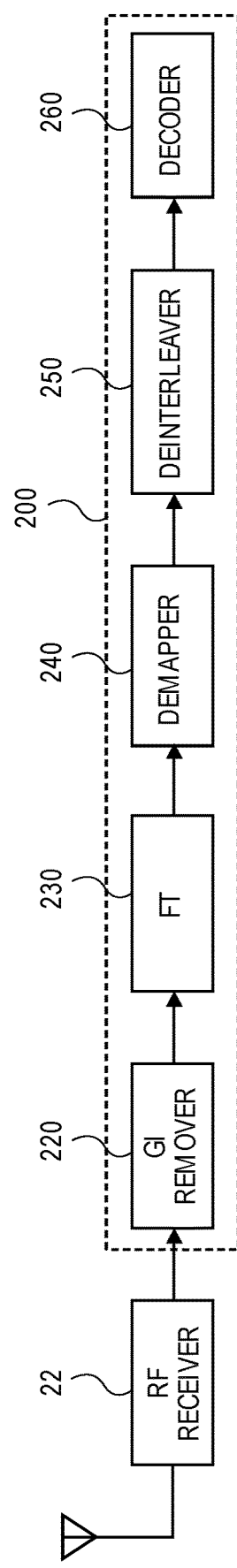
FIG. 15 is a schematic block diagram exemplifying a receiving signal processing unit in the WLAN, according to some embodiments.

FIG. 15 is a schematic block diagram exemplifying a receiving signal processing unit in the WLAN, according to some embodiments. Referring to FIG. 15, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 16:
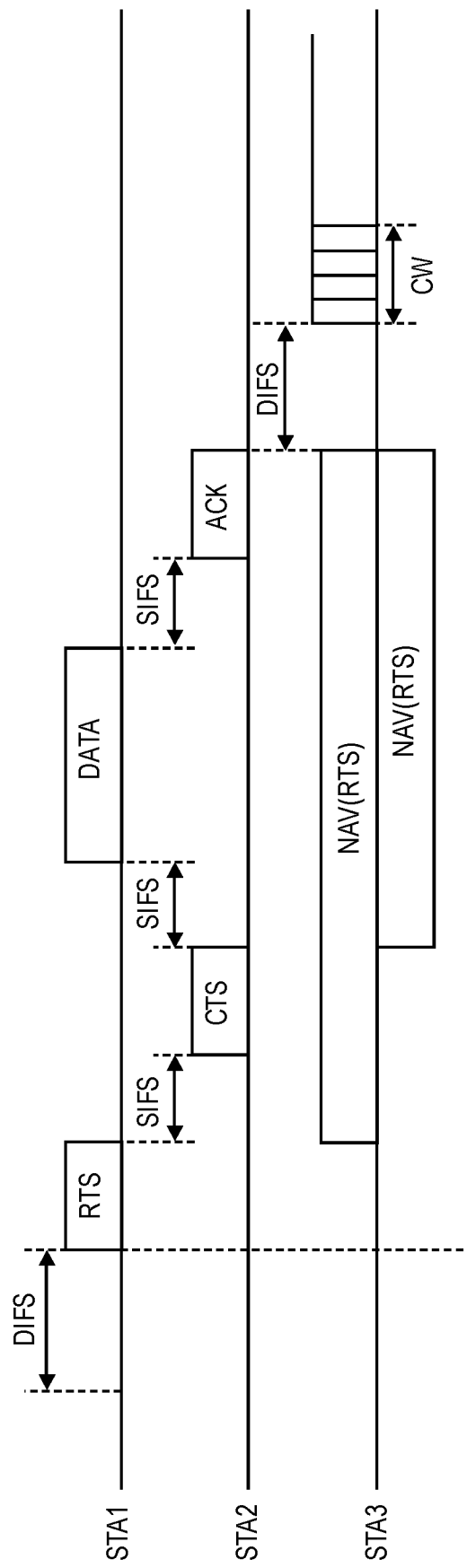
FIG. 16 is a timing diagram providing an example of the Carrier Sense Multiple Access/Collision Avoidance (CSMA/CA) transmission procedure, according to some embodiments.

FIG. 16 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

Figure 17:
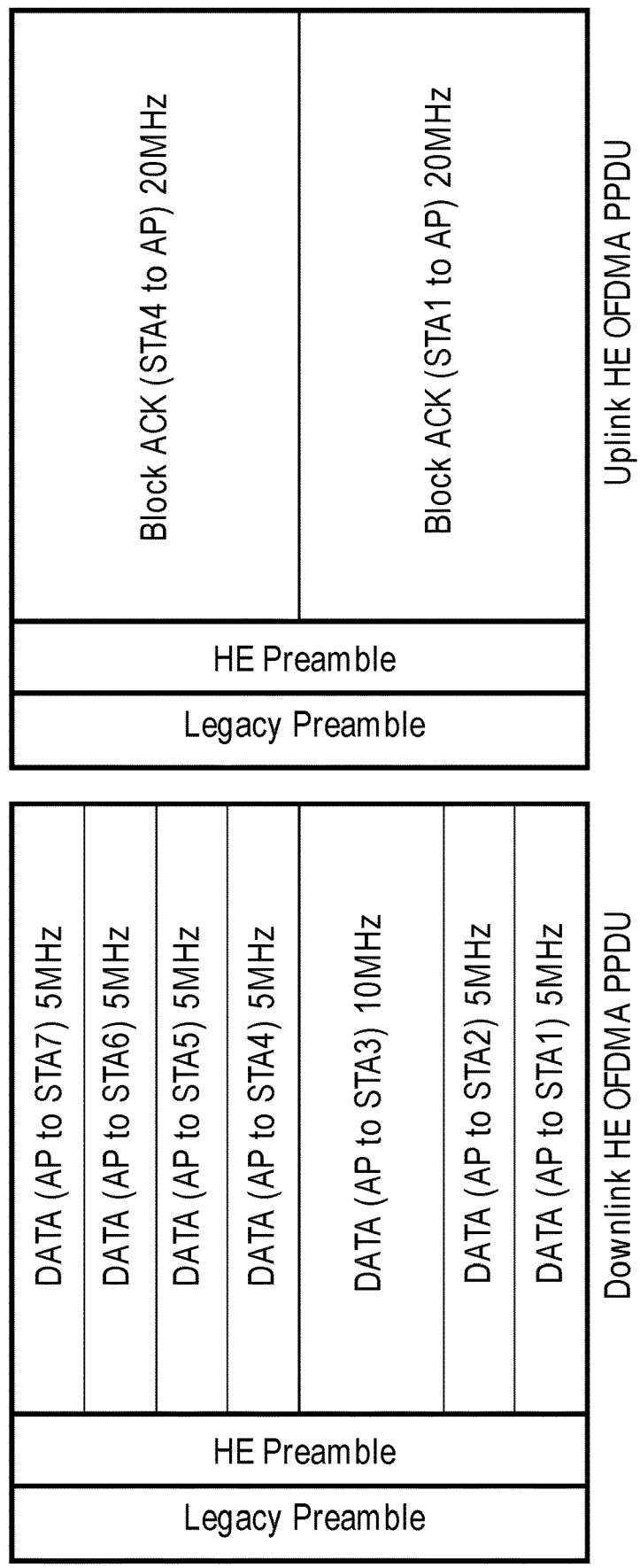
FIG. 17 is a diagram illustrating a DL MU PPDU and UL MU PPDU exchange, according to some embodiments.

FIG. 17 is a diagram illustrating a DL MU PPDU and UL MU PPDU exchange, according to some embodiments. In the illustrated example, an AP transmits a DL OFDMA PPDU in a High Efficiency (HE) PPDU format. The HE PPDU format includes a legacy preamble, an HE preamble, and data destined for each STA. The AP transmits the data for STA1, STA2, STA3, STA4, STA5, STA6, and STA7 through sub-channels of 5 MHz, 5 MHz, 10 MHz, 5 MHz, 5 MHz, 5 MHz, and 5 MHz, respectively. In this example, after SIFS time from receiving the DL OFDMA PPDU, STA1 and STA4 transmit control response frames in a UL OFDMA PPDU in an HE PPDU format (e.g., through sub-channels of 20 MHz and 20 MHz, respectively).

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An access point device, coupled to a station through a wireless local area network, configured to elicit a trigger-based immediate acknowledgement from the station, further configured to:
   generate trigger information for an uplink (UL) multiuser (MU) transmission;
   generate a frame,
      wherein an acknowledgement (ACK) policy field of the frame is set to a binary value of '01' to request the station to provide a trigger-based immediate acknowledgement where the station is to transmit a trigger-based immediate acknowledgement frame to the access point device according to the trigger information if the trigger information is obtained by the station and the station is to refrain from transmitting the trigger-based immediate acknowledgement frame to the access point device if the trigger information is not obtained by the station,
      wherein the binary value of '01' is a reserved value in a Power Save Multi-Poll (PSMP) context for indicating that a response frame to a received frame is allowed but neither an acknowledgement frame nor any data frame of subtype Contention Free-Acknowledgement (+CF-Ack) when bit 6 of a frame control field is set to '1', and for indicating that an acknowledgment for a frame received in a PSMP downlink transmission time (PSMP-DTT) is to be received in a later PSMP uplink transmission time (PSMP-UTT) when bit 6 of the frame control field is set to '0'; and
   transmit a downlink (DL) MU physical layer (PHY) Protocol Data Unit (PPDU) to the station, wherein the DL MU PPDU includes the frame and the trigger information.

2. The access point device of claim 1, wherein the frame is a data frame.

3. The access point device of claim 1, further configured to:
   transmit a Block ACK Request frame for the frame to the station after the access point device transmits the DL MU PPDU to the station in response to a determination that the station did not transmit the trigger-based immediate acknowledgement frame to the access point device.

4. The access point device of claim 1, wherein the trigger information includes information regarding an allocation of transmission resources for the UL MU transmission.

5. An access point device, coupled to a station through a wireless local area network, configured to elicit a trigger-based immediate acknowledgement from the station, further configured to:
   generate trigger information for an uplink multi-user transmission;
   generate a frame,
      wherein an ACK policy field of the frame is set to a binary value of '01' to request the station to provide a trigger-based immediate acknowledgement,
      wherein the station is to transmit a trigger-based immediate acknowledgement frame to the access point according to the trigger information if the trigger information is obtained by the station and the station is to not transmit the trigger-based immediate acknowledgement frame to the access point if the trigger information is not obtained by the station,
      wherein the trigger information includes information in regard to an allocation of transmission resources for the uplink multi-user transmission; and
   transmit a downlink multi-user physical layer protocol data unit to the station, wherein the downlink multi-user physical layer protocol data unit includes the frame and the trigger information.

6. The access point device of claim 5, wherein the binary value of '01' is a reserved value for acknowledgement in a Power Save Multi-Poll (PSMP) context.

7. The access point device of claim 6, wherein the ACK policy field set to the binary value of '01' in the PSMP context indicates to the station that a response frame to a received frame is allowed but is neither an acknowledgement frame nor any data frame of subtype Contention Free-Acknowledgement (+CF-Ack) when bit 6 of a frame control field is set to '1'.

8. The access point device of claim 6, wherein the ACK policy field set to the binary value of '01' in the PSMP context indicates to the station that an acknowledgment for a frame received in a PSMP downlink transmission time (PSMP-DTT) is to be received in a later PSMP uplink transmission time (PSMP-UTT) when bit 6 of a frame control field is set to '0'.

* * * * *